United States Patent
Chambliss et al.

(10) Patent No.: US 9,891,824 B2
(45) Date of Patent: Feb. 13, 2018

(54) SUB-BLOCK INPUT/OUTPUT (I/O) COMMANDS FOR STORAGE DEVICE INCLUDING BYTE STREAM BUFFER

(71) Applicant: International Business Machines Corporation, Armonk, NY (US)

(72) Inventors: David D. Chambliss, Morgan Hill, CA (US); Lawrence Y. Chiu, Saratoga, CA (US); Hyojun Kim, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 371 days.

(21) Appl. No.: 14/695,583

(22) Filed: Apr. 24, 2015

(65) Prior Publication Data

US 2016/0313919 A1 Oct. 27, 2016

(51) Int. Cl.
*G06F 12/00* (2006.01)
*G06F 3/06* (2006.01)

(52) U.S. Cl.
CPC ............ *G06F 3/0604* (2013.01); *G06F 3/061* (2013.01); *G06F 3/0659* (2013.01); *G06F 3/0673* (2013.01)

(58) Field of Classification Search
CPC ...... G06F 3/0604; G06F 3/061; G06F 3/0659; G06F 3/0673
See application file for complete search history.

(56) References Cited

U.S. PATENT DOCUMENTS

| 6,141,747 A | 10/2000 | Witt |
| 2009/0019272 A1 | 1/2009 | Cypher et al. |
| 2010/0042775 A1* | 2/2010 | Yeh ...................... G06F 12/0246 711/103 |
| 2010/0169619 A1 | 7/2010 | Yeh et al. |
| 2011/0055458 A1* | 3/2011 | Kuehne ............... G06F 12/0246 711/103 |
| 2013/0117503 A1* | 5/2013 | Nellans ............... G06F 12/0246 711/103 |

OTHER PUBLICATIONS

Author's Disclosed Anonynmously, "An Application Level, Non-Volatile Memory Management Mechanism," IP.com No. 000146570; Published: Feb. 16, 2007; pp. 1-6.
(Continued)

*Primary Examiner* — Matthew Bradley
(74) *Attorney, Agent, or Firm* — Cantor Colburn LLP; Bryan W. Butler

(57) ABSTRACT

Embodiments relate to sub-block input/output (I/O) commands in a computer storage device. An aspect includes receiving a plurality of I/O commands on an I/O interface of the computer storage device, the computer storage device comprising a byte stream buffer module comprising a plurality of byte stream buffers, a block buffer module comprising a plurality of block buffers, and a main storage comprising a plurality of fixed-size storage blocks. Another aspect includes processing the plurality of I/O commands by the computer storage device. Another aspect includes a block write command comprising a command to write an amount of write data having a size equal to one of the plurality of a fixed-size storage block. Another aspect includes a sub-block write command comprising a command to write an amount of write data having a size that is less than a size of a fixed-size storage block.

17 Claims, 8 Drawing Sheets

(56) References Cited

OTHER PUBLICATIONS

D. Cromer, et al., "Extensible Structure for Managing Sysytem Asset Information in a Non-Volatile Storage Element: EAIA (Enhanced Asset Information Area)," IP.com No. 000123838; Publication No. May 1, 1999; pp. 1-11.

M-K Sed, et al., "NLE-EFS: A Flash File System with PRAM for Non-Linear Editing," IEEE Transactions on Consumer Electronics, vol. 55, No. 4, Nov. 2009; pp. 2016-2024.

* cited by examiner

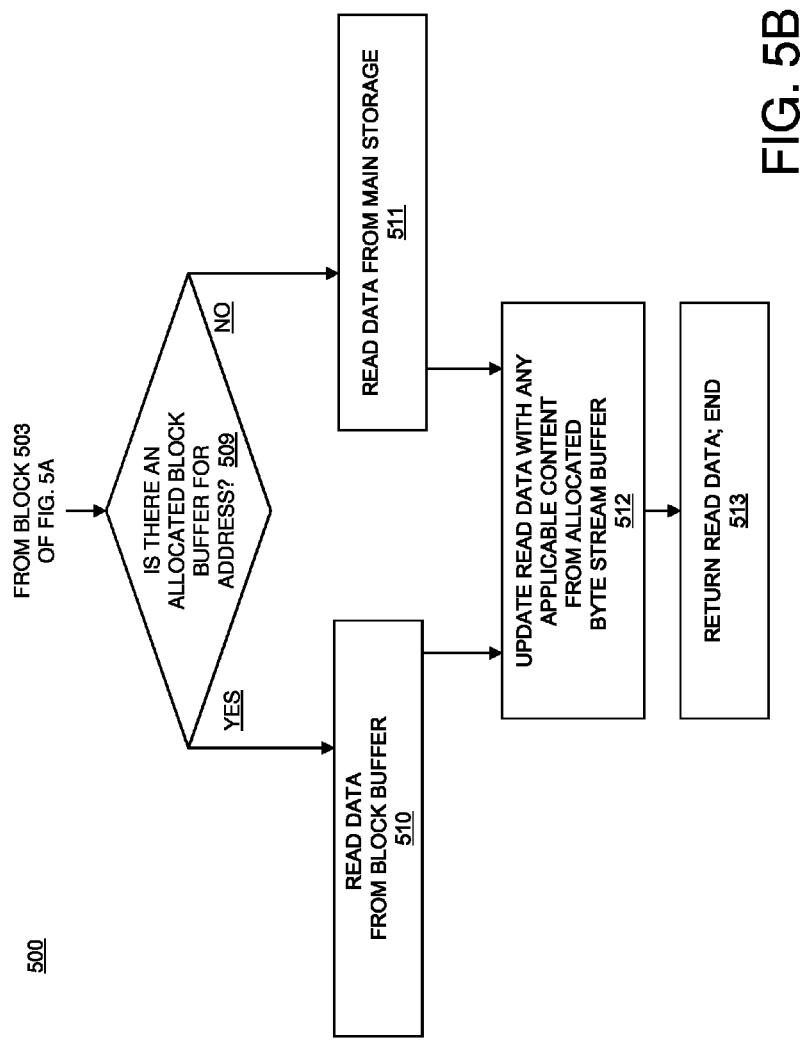

SUB-BLOCK INPUT/OUTPUT (I/O) COMMANDS FOR STORAGE DEVICE INCLUDING BYTE STREAM BUFFER

BACKGROUND

The present invention relates generally to computer storage devices, and more specifically, to sub-block input/output (I/O) commands, i.e., sub-block read and sub-block write, for a computer storage device including a byte stream buffer.

In order to store information in a computer system, a physical computer storage device is used. A computer storage device may be divided into fixed storage blocks, each holding the same amount of data (for example, 512 bytes, 4K bytes, or 8K bytes per block). Input/output (I/O) commands, such as reading from and writing to the computer storage device, may only be performed in increments corresponding to the size of a fixed block. For example, in order to perform a read from the computer storage device, one or more entire blocks of data are read out, regardless of the size of the data required for the read. Further, in order to perform a write to the computer storage device of an amount of data that is less than the size of a fixed block, an entire block of data is read out, the block data is updated with the write data, and the updated block is then written back into the computer storage device.

BRIEF SUMMARY

Embodiments include a method, system, and computer program product for sub-block input/output (I/O) commands in a computer storage device. An aspect includes receiving a plurality of I/O commands on an I/O interface of the computer storage device, the computer storage device comprising a byte stream buffer module comprising a plurality of byte stream buffers, a block buffer module comprising a plurality of block buffers, and a main storage comprising a plurality of fixed-size storage blocks. Another aspect includes processing the plurality of I/O commands by the computer storage device. Another aspect includes a block write command comprising a command to write an amount of write data having a size equal to one of the plurality of fixed-size storage blocks into the computer storage device. Another aspect includes a sub-block write command comprising a command to write an amount of write data having a size that is less than a size of one of the plurality of fixed-size storage blocks into the computer storage device.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIGS. 5A-B depicts a process flow for a sub-block read in a computer storage device in accordance with an embodiment;

DETAILED DESCRIPTION

Embodiments of sub-block I/O commands for a computer storage device including a byte stream buffer module are provided, with exemplary embodiments being discussed below in detail. Some workloads in a computer system may generate reads and writes that involve a data size that is smaller than the fixed block size of a computer storage device, i.e., sub-block reads and sub-block writes. In order to handle such sub-block I/O commands, a byte stream buffer module including a plurality of byte stream buffers is provided. The byte stream buffer module is used in conjunction with a block buffer module including a plurality of block-sized buffers to cache data that is written to and read from a main storage of the storage device. The byte stream buffers are addressable at the block level, and may store read and write data of any size that is less than the size of a fixed block. Embodiments of a computer storage device that implements sub-block I/O commands may be used in conjunction with workloads that generate relatively small reads and writes, such as, for example, key-value storage, database management systems (DBMS), or a journaling or log-structured file systems.

Figure 1:
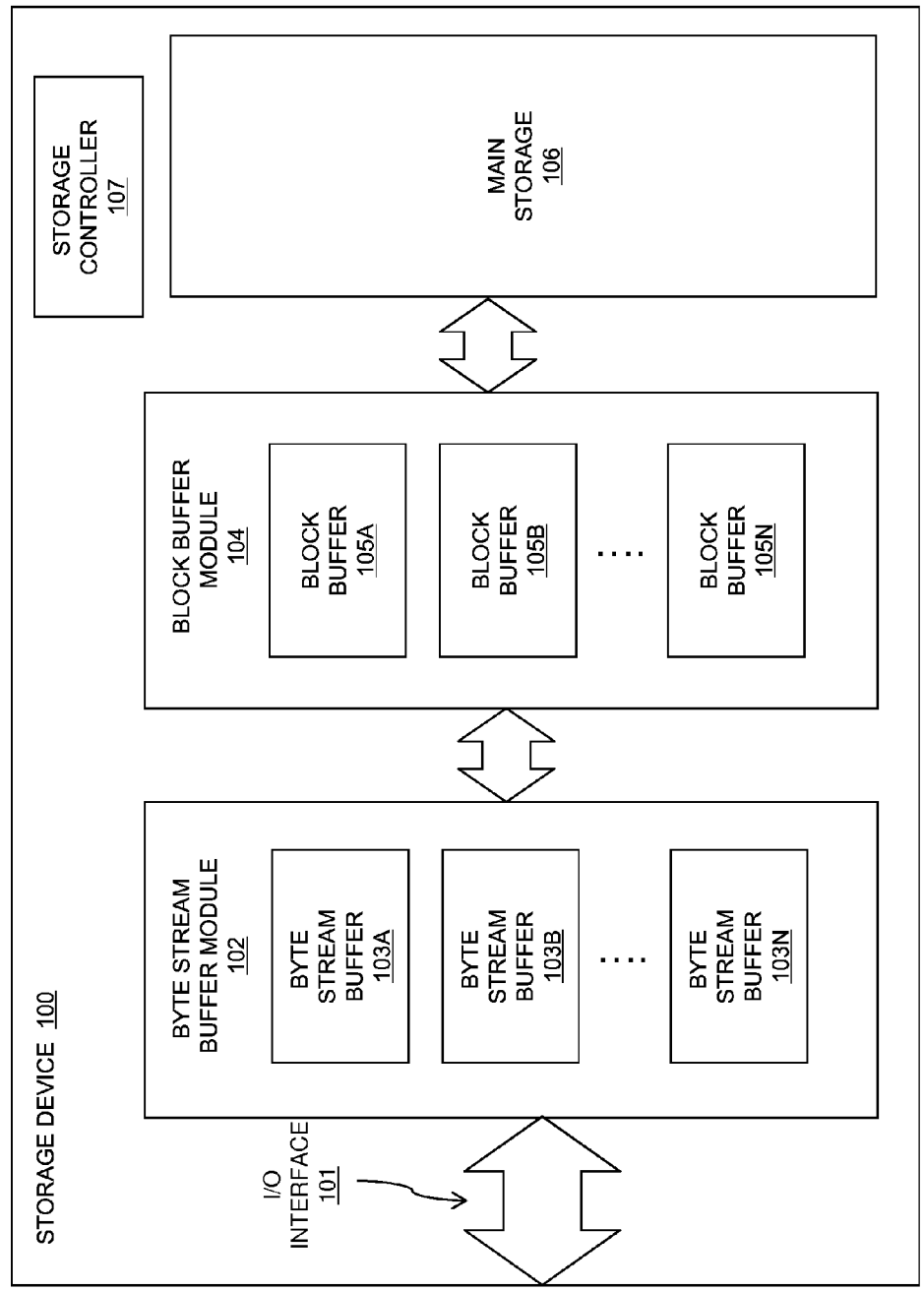
FIG. 1 depicts a computer storage device including a byte stream buffer module for use in conjunction with sub-block I/O commands in accordance with an embodiment.

FIG. 1 illustrates an embodiment of a computer storage device 100 for use in conjunction with sub-block I/O commands. The storage device 100 includes an I/O interface 101, which receives I/O commands, including block reads, block writes, sub-block reads, and sub-block writes, from a processor that is in communication with the storage device 100. The I/O interface may support small computer system interface (SCSI) block I/O commands, in addition to the sub-block I/O commands. In some embodiments, the I/O interface determines what kind of I/O command is being received (i.e., block or sub-block) based on the size of the I/O request. For example, a block I/O command may be a multiple of 512 bytes, while a sub-block I/O command may be less than 512 bytes or not a multiple of 512 bytes. The storage device 100 further includes a byte stream buffer module 102, block buffer module 104, main storage 106, and a storage controller 107. The main storage 106 comprises computer memory that is divided up into storage blocks, each of the storage blocks have a fixed size (for example, 512 bytes, 4K bytes, or 8K bytes per block). The block buffer module 104 comprises a smaller memory than the main storage 106 that is used as a cache memory for buffering read and write data. The block buffer module comprises a plurality of block buffers 105A-N; each of block buffers 105A-N is the same size as the fixed blocks in the main storage 106 and is used to store full blocks of data. The number of block buffers 105A-N is less than the number of storage blocks in main storage 106, and block buffers may be allocated and deallocated to particular storage blocks in the main storage 106 as needed during command of storage device 100. The byte stream buffer module 102 comprises another cache memory made up of a plurality of byte stream buffers 103A-N that are used to buffer data for fulfilling sub-block read and write commands received on I/O interface 101. Each of byte stream buffers 103A-N may be of a size that is equal to or less that a size of the fixed blocks in the main storage, and may store data having any size that is less than the size of a fixed block. Each of byte stream buffers 103A-N and block buffers 105A-N contains an address field that can hold an address of a block in the main storage 106 to which the buffer is currently allocated, and also data storage. Storage controller 107 may be in communication with each of the elements of storage device 100 and coordinate any commands within storage device 100. FIG. 1 is shown for illustrative purposes only; for example, the main storage 106, block buffer module 104, and byte stream buffer module 102 may each be any appropriate size. Method 200, describing an embodiment of a block write; method 300, describing an embodiment of a block read; method 400, describing an embodiment of a sub-block write; method 500, describing an embodiment of a sub-block read; and method 600, describing an embodiment of a flush of a byte stream buffer, which are discussed below with respect to FIGS. 2-6, respectively, are implemented in various embodiments of a storage device such as storage device 100 that is shown in FIG. 1. In some embodiments, the byte stream buffer module 102 and the block buffer module 104 are random access memory (RAM) buffers, and are protected from power outages by a capacitor or battery that may power the RAM buffers in case of power outage, and the main storage is a form of non-volatile storage media. In some embodiments, the byte stream buffer module 102, the block buffer module 104, and the main storage 106 may be phase-change memory.

Figure 2:
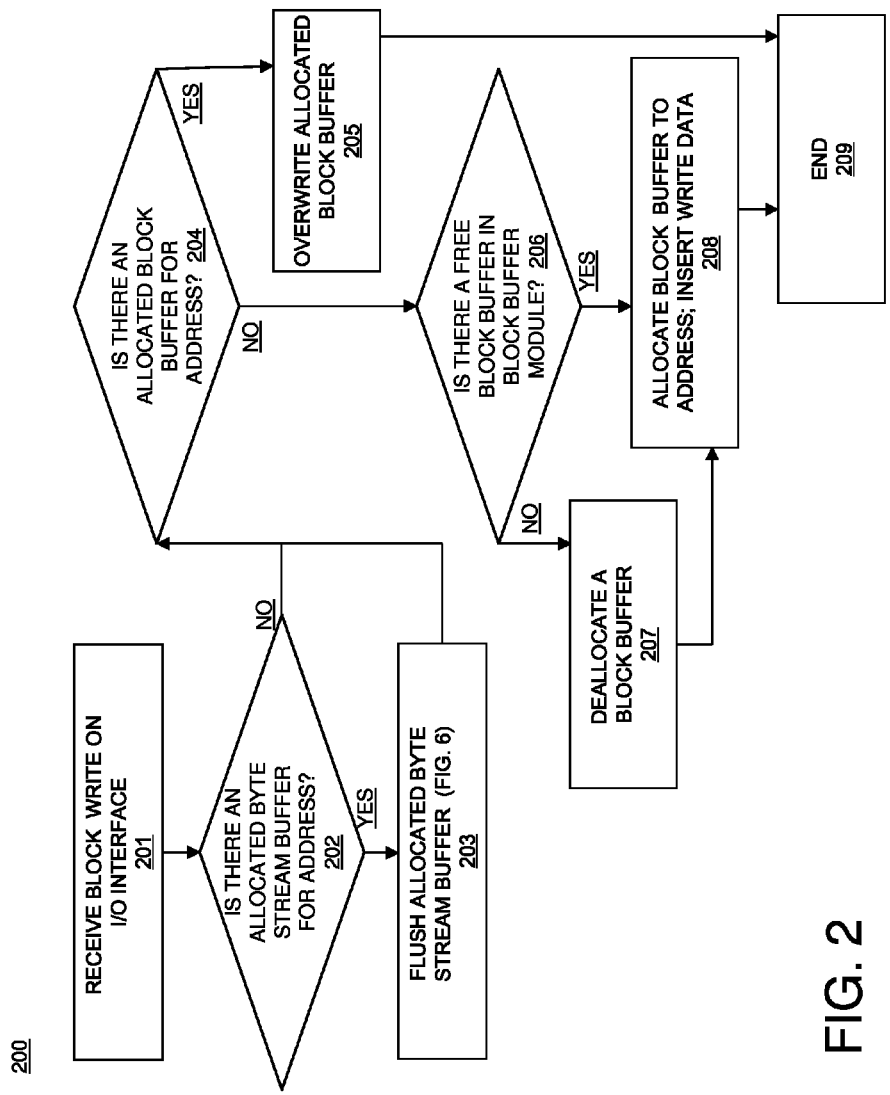
FIG. 2 depicts a process flow for a block write in a computer storage device in accordance with an embodiment.

FIG. 2 illustrates an embodiment of a method 200 for performing a block write in storage device 100. First, in block 201, a block write command is received on I/O interface 101. The block write command includes a write address designating a particular block in the main storage 106 that is the target of the block write command, and write data comprising an amount of data corresponding to the size of a fixed storage block in main storage 106. Then, in block 202, it is determined whether the byte stream buffer module 102 currently contains a byte stream buffer of byte stream buffers 103A-N that is allocated to the write address of the block write that was received in block 201. If it is determined in block 202 that the byte stream buffer module 102 contains a byte stream buffer that is allocated to the write address, flow proceeds to block 203, in which the allocated byte stream buffer is flushed; this is discussed in further detail in method 600 of FIG. 6 below. Flow then proceeds from block 203 to block 204. If it is determined in block 202 that the byte stream buffer module 102 does not contain a byte stream buffer that is allocated to the write address, flow proceeds from block 202 directly to block 204.

In block 204, it is determined whether there is a block buffer of block buffers 105A-N in block buffer module 104 that is currently allocated to the write address. If it is determined in block 204 that there is a block buffer in block buffer module 104 that is allocated to the write address, flow proceeds from block 204 to block 205, in which the allocated block buffer is completely overwritten with the write data of the block write. Flow then proceeds from block 205 to block 209, and method 200 ends. If it is determined in block 204 that there is not a block buffer in block buffer module 104 that is allocated to the write address, flow proceeds from block 204 to block 206, in which it is determined whether there is a free block buffer in the block buffer module 104. If it is determined in block 206 that there is not a free block buffer, flow proceeds from block 206 to block 207, in which a block buffer of block buffers 105A-N is deallocated (i.e., made free for allocation to another block address), and flow proceeds from block 207 to block 208. The data in the deallocated block buffer is written into the corresponding block in the main storage 106. The deallocation may be performed based on, for example, a least recently used (LRU) algorithm. If it is determined in block 206 that there is a free block buffer, flow proceeds from block 206 directly to block 208. In block 208, a block buffer of block buffers 105A-N is allocated to the write address, and the write data is inserted into the allocated block buffer. Flow then proceeds from block 208 to block 209, and method 200 ends.

Figure 3:
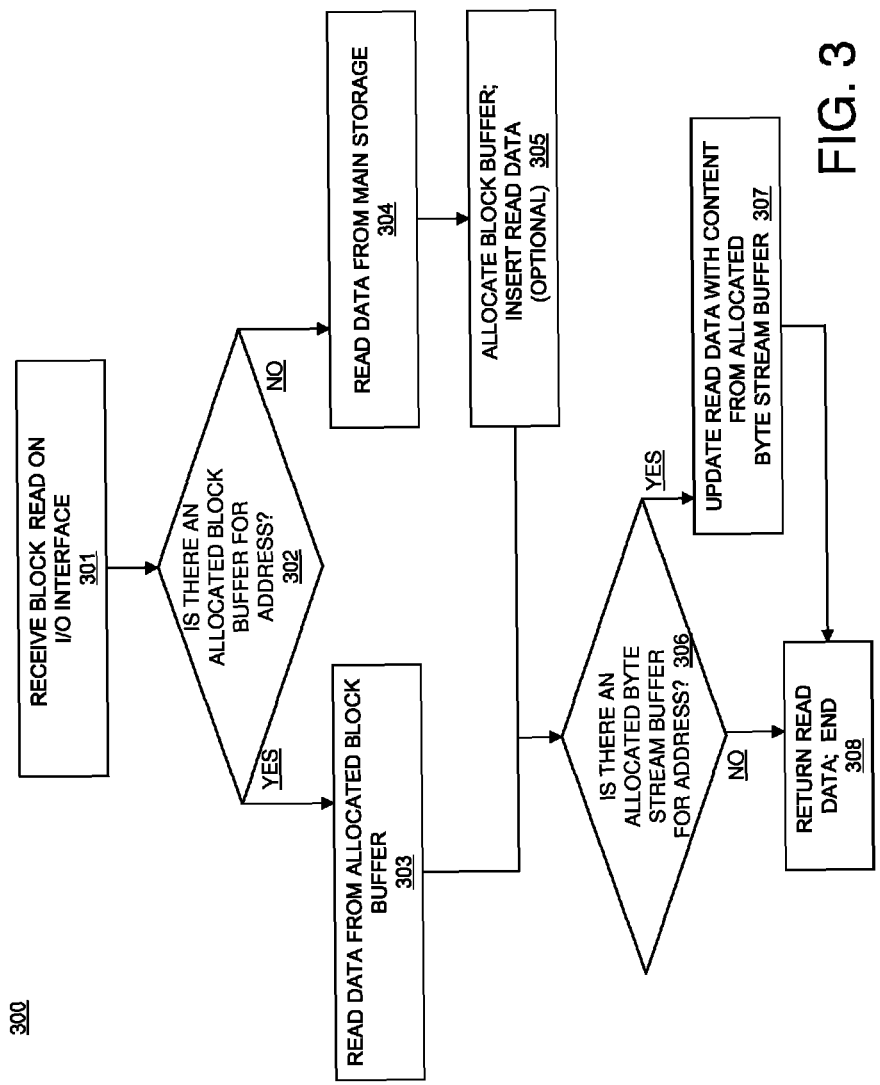
FIG. 3 depicts a process flow for a block read in a computer storage device in accordance with an embodiment.

FIG. 3 illustrates an embodiment of a method 300 for performing a block read in storage device 100. First, in block 301, a block read command is received on I/O interface 101. The block read command is a request to read an amount of data corresponding to the size of a fixed storage block in main storage 106, and includes a read address designating a particular block in the main storage 106. Then, in block 302, it is determined whether the block buffer module 104 currently contains a block buffer of block buffers 105A-N that is allocated to the read address of the read command that was received in block 301. If it is determined in block 302 that there is a block buffer allocated to the read address in the block buffer module 104, flow proceeds from block 302 to block 303, and the read data is read from the allocated block buffer. Flow then proceeds from block 303 to block 306. If it is determined in block 302 that there is not a block buffer allocated to the read address in the block buffer module 104, flow proceeds from block 302 to block 304, and the read data is read from block located at the read address in the main storage 106. Next, in some embodiments, in block 305, a block buffer of block buffers 105A-N in block buffer module 105 is allocated to the read address and the read data is inserted into the allocated block buffer. Then flow proceeds from block 305 to block 306.

In block 306, it is determined whether the byte stream buffer module 102 currently contains a byte stream buffer of byte stream buffers 103A-N that is allocated to the read address. If it is determined in block 306 that there is a byte stream buffer allocated to the read address in byte stream buffer module 102, flow proceeds from block 306 to block 307, and the read data that was obtained in either block 303 or block 304 is updated with the data that is in the allocated byte stream buffer. Flow then proceeds from block 307 to block 308. If it is determined in block 306 that there is not a byte stream buffer allocated to the read address in byte stream buffer module 102, flow proceeds from block 306 directly to block 308. In block 308, the read data is returned on I/O interface 101 on I/O interface 101, and method 300 ends.

Figure 4:
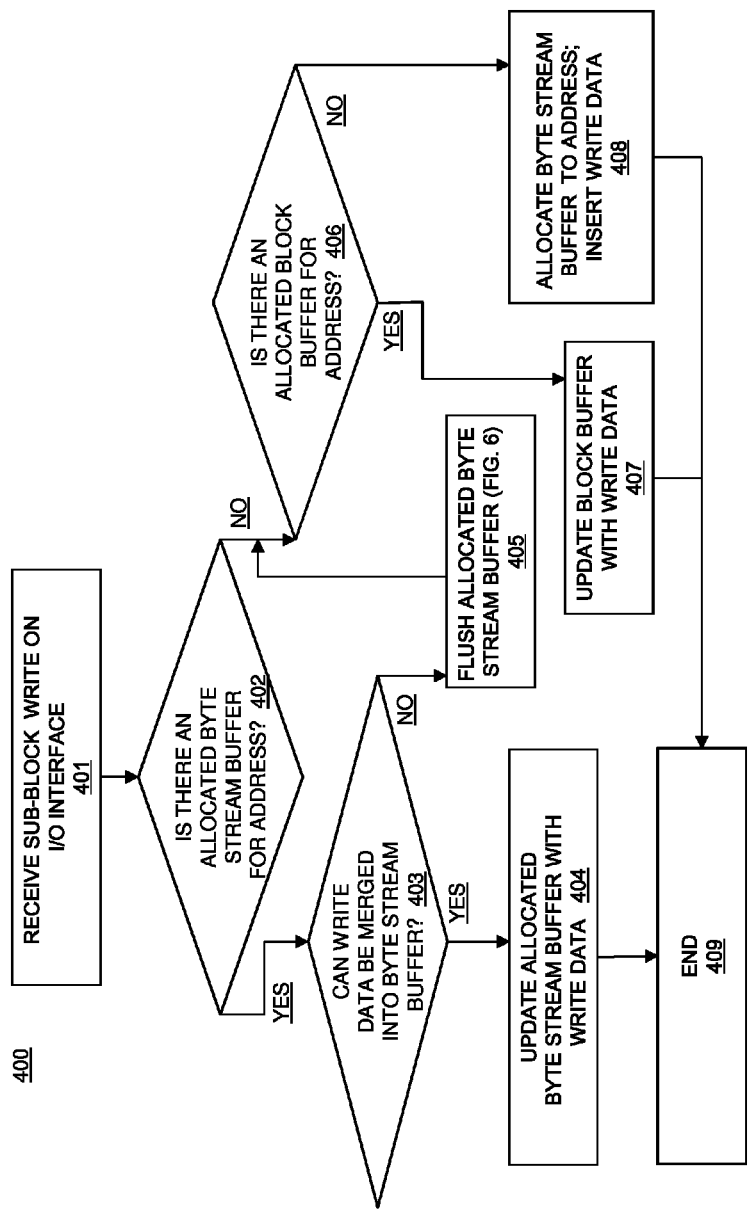
FIG. 4 depicts a process flow for a sub-block write in a computer storage device in accordance with an embodiment.

FIG. 4 illustrates an embodiment of a method 400 for performing a sub-block write in storage device 100. First, in block 401, a sub-block write command is received on I/O interface 101. The sub-block write command includes a write address designating a particular block in the main storage 106, and write data comprising an amount of data corresponding a size that is less than the size of a fixed storage block in main storage 106. Then, in block 402, it is determined whether the byte stream buffer module 102 currently contains a byte stream buffer of byte stream buffers 103A-N that is allocated to the write address of the sub-block write that was received in block 401. If it is determined in block 402 that the byte stream buffer module 102 does not contain a byte stream buffer that is allocated the write address, flow proceeds directly from block 402 to block 406. If it is determined in block 402 that the byte stream buffer module 102 currently contains a byte stream buffer that is allocated the write address, flow proceeds from block 402 to block 403, in which it is determined whether the write data can be merged into the allocated byte stream buffer. The sub-block write can be merged into the allocated byte stream buffer if the allocated byte stream buffer holds a range of addresses that overlap with or are directly adjacent to the write address. If it is determined in block 403 that the write data can be merged into the allocated byte stream buffer, flow proceeds from block 403 to block 404, in which the allocated byte stream buffer is updated (i.e., either fully or partially overwritten) with the write data. Flow then proceeds from block 404 to block 409, and method 400 ends. If it is determined in block 403 that the write data cannot be merged into the allocated byte stream buffer, flow proceeds from block 403 to block 405, in which the allocated byte stream buffer is flushed; this is discussed in further detail in method 600 of FIG. 6 below. Flow then proceeds from block 405 to block 406.

In block 406, it is determined whether there is a block buffer of block buffers 105A-N in block buffer module 104 that is currently allocated to the write address of the sub-block write. If it is determined in block 406 that there is a block buffer that is currently allocated to the write address, flow proceeds from block 406 to block 407, in which the allocated block buffer is updated (i.e., partially overwritten) with the write data of the sub-block write. Flow then proceeds from block 407 to block 409, and method 400 ends. If it is determined in block 406 that there is not a block buffer in block buffer module 104 that is currently allocated to the write address, flow proceeds from block 406 to block 408, in which a byte stream buffer in the byte stream buffer module 102 is allocated to the write address, and the write data is inserted into the newly allocated byte stream buffer. If needed in block 408 (i.e., if the byte stream buffer module 102 is full), a byte stream buffer of byte stream buffers 103A-N may be deallocated (based on, for example, a LRU algorithm) and then reallocated to the write address. The deallocated byte stream buffer may be flushed as described in FIG. 6. Flow then proceeds from block 408 to block 409, and method 400 ends.

Figure 5A:
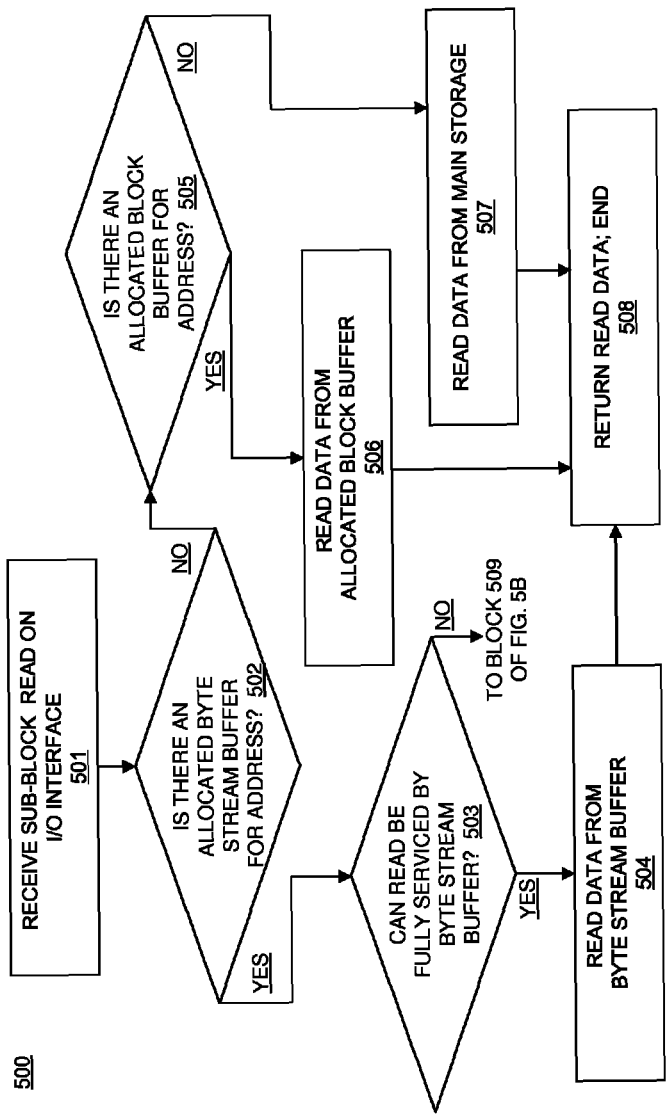

FIGS. 5A-B illustrate an embodiment of a method 500 for performing a sub-block read in storage device 100. First, in block 501 of FIG. 5A, a sub-block read command is received on I/O interface 101. The sub-block read command is a request to read an amount of data of a size that is less than the size of a fixed storage block in main storage 106, and includes a read address designating a particular block in the main storage 106. In block 502, it is determined whether the byte stream buffer module 102 currently contains a byte stream buffer of byte stream buffers 103A-N that is allocated to the read address of the sub-block read. If it is determined in block 502 that there is a byte stream buffer allocated to the read address in byte stream buffer module 102, flow proceeds from block 502 to block 503, in which it is determined whether the sub-block read can be fully serviced from the data in the allocated byte stream buffer. If it is determined in block 503 that the sub-block read can be fully serviced from the allocated byte stream buffer, the read data is read from the allocated byte stream buffer in block 504. Then flow proceeds from block 504 to block 508, in which the read data is returned on I/O interface 101, and method 500 ends. If it is determined in block 503 that the sub-block read cannot be fully serviced from the allocated byte stream buffer, flow proceeds to block 509 in FIG. 5B, which is discussed in further detail below.

If it is determined in block 502 of FIG. 5A that there is not a byte stream buffer allocated to the read address in byte stream buffer module 102, flow proceeds from block 502 to block 505, in which it is determined whether the block buffer module 104 currently contains a block buffer of block buffers 105A-N that is allocated to the read address of the sub-block read command that was received in block 501. If it is determined in block 505 that there is a block buffer allocated to the read address in the block buffer module 104, flow proceeds from block 505 to block 506, and the read data is read from the allocated block buffer. Flow then proceeds from block 506 to block 508. If it is determined in block 505 that there is not a block buffer allocated to the read address in the block buffer module 104, flow proceeds from block 505 to block 507, and the read data is read from block located at the read address in the main storage 106. Then flow proceeds to block 508. In block 508, the read data is returned on I/O interface 101, and method 500 ends.

In block 509 of FIG. 5B, it is determined whether the block buffer module 104 currently contains a block buffer of block buffers 105A-N that is allocated to the read address of the sub-block read command that was received in block 501. If it is determined in block 509 that there is a block buffer allocated to the read address in the block buffer module 104, flow proceeds from block 509 to block 510, and the read data is read from the allocated block buffer. Flow then proceeds from block 510 to block 512. If it is determined in block 509 that there is not a block buffer allocated to the read address in the block buffer module 104, flow proceeds from block 509 to block 511, and the read data is read from the block located at the read address in the main storage 106. Then flow proceeds to block 512. In block 512, the read data that was obtained in either block 510 or block 511 is updated with any data that is applicable to the sub-block read that is in stored the byte stream buffer that is allocated to the read address. Then, in block 513, the read data is returned on I/O interface 101, and method 500 ends.

Figure 6:
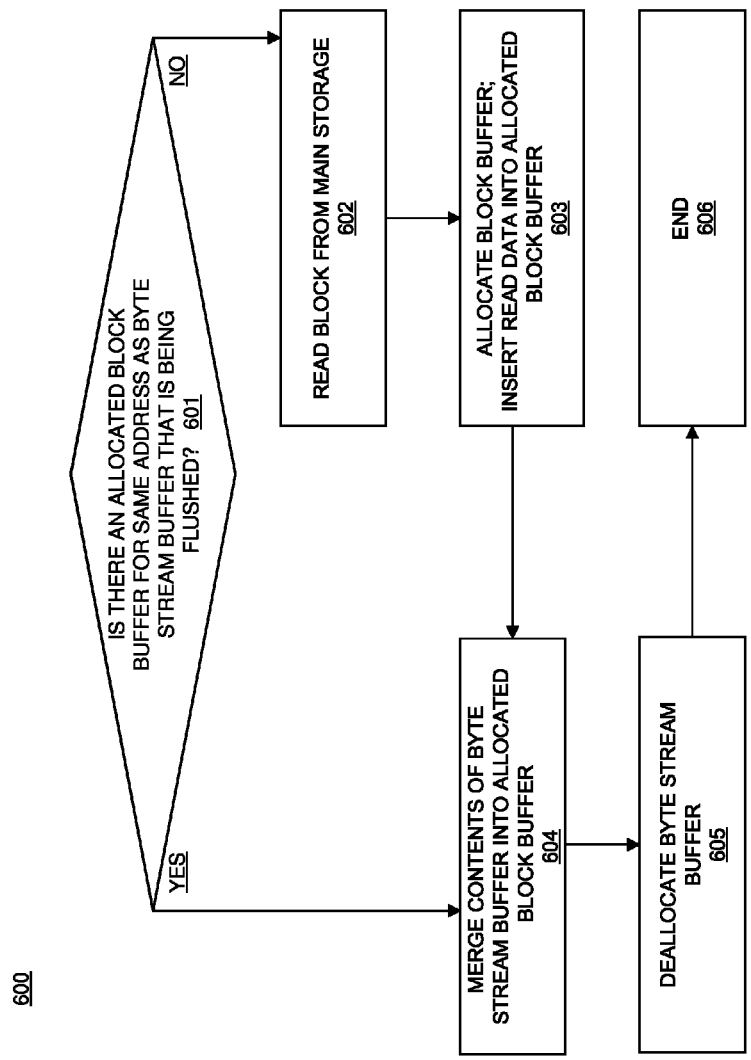
FIG. 6 depicts a process flow for a flushing a byte stream buffer in accordance with an embodiment.

FIG. 6 illustrates an embodiment of a method 600 for flushing a byte stream buffer of byte stream buffers 103A-N in byte stream buffer module 102 that is allocated to a particular address, as is performed in block 203 of FIG. 2, and in block 405 of FIG. 4. First, in block 601, it is determined whether there is a block buffer in block buffer module 104 that is allocated to the same address as the byte stream buffer that is being flushed. If it is determined in block 601 that there is a block buffer allocated to the same address as the byte stream buffer that is being flushed, flow proceeds directly from block 601 to block 604. If it is determined in block 601 that there is not a block buffer allocated to the same address as the byte stream buffer that is being flushed, flow proceeds from block 601 to block 602, and the data in the block corresponding to the particular address is read from the main storage 106. Then, in block 603, a block buffer of block buffers 105A-N in block buffer module 104 is allocated to the particular address, and the data that was read from main storage 106 in block 602 is inserted into the newly allocated block buffer. If needed in block 603 (i.e., if the block buffer module 104 is full), a block buffer of block buffers 105A-N may be deallocated (based on, for example, a LRU algorithm) and then reallocated to the particular address. The data in the deallocated block buffer is written into the corresponding block in the main storage 106. Then flow proceeds from block 603 to block 604. In block 604, the contents of the byte stream buffer that is being flushed are merged into the block buffer that is allocated to the same address, i.e., the data in the allocated block buffer is partially overwritten with the data from the byte stream buffer that is being flushed. Then, in block 605, the byte stream buffer that is being flushed is deallocated, such that the deallocated byte stream buffer may be reallocated as needed to another block address. Flow then proceeds to block 606, in which method 600 ends.

Figure 7:
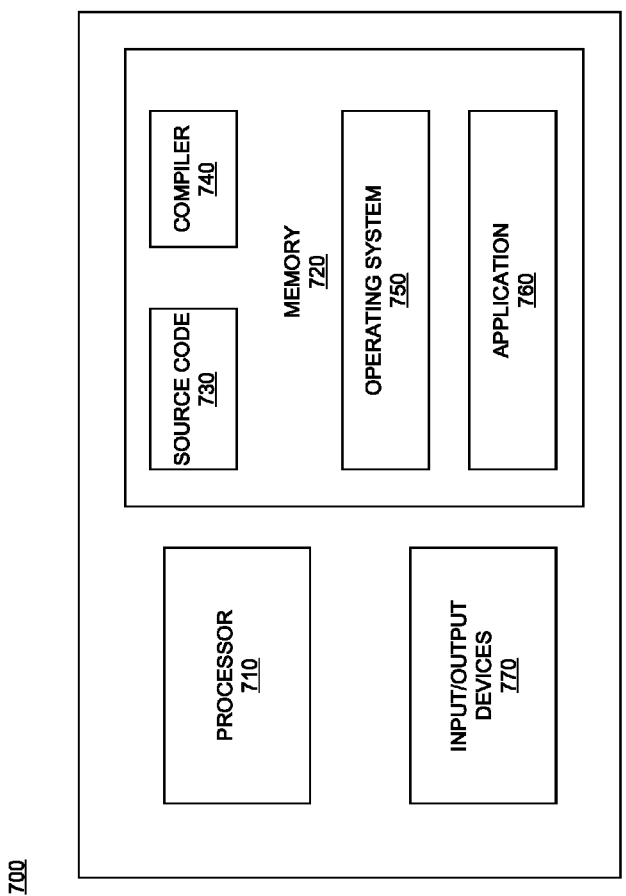
FIG. 7 depicts an embodiment of a computer system for use in conjunction with a computer storage device including a byte stream buffer module that implements sub-block I/O commands.

FIG. 7 illustrates an example of a computer 700 which may be utilized by exemplary embodiments of a computer storage device that includes a byte stream buffer module and implements sub-block I/O commands. Various commands discussed above may utilize the capabilities of the computer 700. One or more of the capabilities of the computer 700 may be incorporated in any element, module, application, and/or component discussed herein. For example, embodiments of storage device 100 may be incorporated into memory 720.

The computer 700 includes, but is not limited to, PCs, workstations, laptops, PDAs, palm devices, servers, storages, and the like. Generally, in terms of hardware architecture, the computer 700 may include one or more processors 710, memory 720, and one or more I/O devices 770 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 710 is a hardware device for executing software that can be stored in the memory 720. The processor 710 can be virtually any custom made or commercially available processor, a central processing unit (CPU), a digital signal processor (DSP), or an auxiliary processor among several processors associated with the computer 700, and the processor 710 may be a semiconductor based microprocessor (in the form of a microchip) or a macroprocessor.

The memory 720 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 720 may incorporate electronic, magnetic, optical, and/or other types of storage media. Note that the memory 720 can have a distributed architecture, where various components are situated remote from one another, but can be accessed by the processor 710.

The software in the memory 720 may include one or more separate programs, each of which comprises an ordered listing of executable instructions for implementing logical functions. The software in the memory 720 includes a suitable operating system (O/S) 750, compiler 740, source code 730, and one or more applications 760 in accordance with exemplary embodiments. As illustrated, the application 760 comprises numerous functional components for implementing the features and commands of the exemplary embodiments. The application 760 of the computer 700 may represent various applications, computational units, logic, functional units, processes, commands, virtual entities, and/or modules in accordance with exemplary embodiments, but the application 760 is not meant to be a limitation.

The operating system 750 controls the execution of other computer programs, and provides scheduling, input-output control, file and data management, memory management, and communication control and related services. It is contemplated by the inventors that the application 760 for implementing exemplary embodiments may be applicable on all commercially available operating systems.

Application 760 may be a source program, executable program (object code), script, or any other entity comprising a set of instructions to be performed. When a source program, then the program is usually translated via a compiler (such as the compiler 740), assembler, interpreter, or the like, which may or may not be included within the memory 720, so as to operate properly in connection with the O/S 750. Furthermore, the application 760 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 770 may include input devices such as, for example but not limited to, a mouse, keyboard, scanner, microphone, camera, etc. Furthermore, the I/O devices 770 may also include output devices, for example but not limited to a printer, display, etc. Finally, the I/O devices 770 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 770 also include components for communicating over various networks, such as the Internet or intranet.

If the computer 700 is a PC, workstation, intelligent device or the like, the software in the memory 720 may further include a basic input output system (BIOS) (omitted for simplicity). The BIOS is a set of essential software routines that initialize and test hardware at startup, start the O/S 750, and support the transfer of data among the hardware devices. The BIOS is stored in some type of read-only-memory, such as ROM, PROM, EPROM, EEPROM or the like, so that the BIOS can be executed when the computer 700 is activated.

When the computer 700 is in command, the processor 710 is configured to execute software stored within the memory 720, to communicate data to and from the memory 720, and to generally control commands of the computer 700 pursuant to the software. The application 760 and the O/S 750 are read, in whole or in part, by the processor 710, perhaps buffered within the processor 710, and then executed.

When the application 760 is implemented in software it should be noted that the application 760 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 760 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store the program for use by or in connection with the instruction execution system, apparatus, or device. The computer readable storage medium can be, for example but not limited to, an electronic, magnetic, optical, electromagnetic, or semiconductor system, apparatus, or a device.

More specific examples (a nonexhaustive list) of the computer-readable storage medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable storage medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 760 is implemented in hardware, the application 760 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects and benefits include efficient handling of relatively small reads and writes in a computer memory.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A nonexhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out commands of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and command of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for sub-block input/output (I/O) commands in a computer storage device, the method comprising:
   receiving a plurality of I/O commands on an I/O interface of the computer storage device, the computer storage device comprising a byte stream buffer module comprising a plurality of byte stream buffers, a block buffer module comprising a plurality of block buffers, and a main storage comprising a plurality of fixed-size storage blocks; and
   processing the plurality of I/O commands by the computer storage device, wherein the plurality of I/O commands comprises:
      a block write command comprising a command to write an amount of write data having a size equal to one of the plurality of fixed-size storage blocks into the computer storage device; and
      a sub-block write command comprising a command to write an amount of write data having a size that is greater than zero and less than a size of one of the plurality of fixed-size storage blocks into the computer storage device,
   wherein processing the block write command comprises:
      determining whether a byte stream buffer of the plurality of byte stream buffers is allocated to a write address of the block write command;
      based on determining that a byte stream buffer of the plurality of byte stream buffers is allocated to the write address of the block write command, flushing the allocated byte stream buffer;
      determining whether a block buffer of the plurality of block buffers is allocated to the write address of the block write command;
      based on determining that a block buffer of the plurality of block buffers is allocated to the write address of the block write command, overwriting the allocated block buffer with the write data; and
      based on determining that no block buffer of the plurality of block buffers is allocated to the write address of the block write command, allocating a block buffer of the plurality of block buffers to the write address and inserting the write data into the allocated block buffer.

2. The method of claim 1, wherein flushing the allocated byte stream buffer comprises:
   determining whether a block buffer of the plurality of block buffers is allocated to a same address as the allocated byte stream buffer;
   based on determining that no block buffer of the plurality of block buffers is allocated to the same address as the allocated byte stream buffer:
      reading block data from the same address in the main storage;
      allocating a block buffer to the same address; and
      inserting the block data into the allocated block buffer;
   merging the contents of the allocated byte stream buffer into the allocated block buffer; and
   deallocating the allocated byte stream buffer.

3. The method of claim 1, wherein the plurality of I/O commands further comprises a block read command comprising a command to read an amount of read data having a size equal to one of the plurality of fixed-size storage blocks from the computer storage device, wherein processing the block read command comprises:
   determining whether a block buffer of the plurality of block buffers is allocated to a read address of the block read command;
   based on determining that a block buffer of the plurality of block buffers is allocated to the read address of the block read command, reading the read data from the allocated block buffer;
   based on determining that no block buffer of the plurality of block buffers is allocated to the read address of the block read command, reading the read data from the read address in the main storage;
   determining whether a byte stream buffer of the plurality of byte stream buffers is allocated to the read address of the block read command; and
   based on determining that a byte stream buffer of the plurality of byte stream buffers is allocated to the read address of the block read command, updating the read data with data from the byte stream buffer.

4. The method of claim 1, wherein processing the sub-block write command comprises:
   determining whether a byte stream buffer of the plurality of byte stream buffers is allocated to a write address of the sub-block write command;
   based on determining that a byte stream buffer of the plurality of byte stream buffers is allocated to the write address of the sub-block write command, writing the write data to the allocated byte stream buffer; and
   based on determining that no byte stream buffer of the plurality of byte stream buffers is allocated to the write address of the sub-block write command:

determining whether a block buffer of the plurality of block buffers is allocated to the write address of the sub-block write command;

based on determining that a block buffer of the plurality of block buffers is allocated to the write address of the sub-block write command, overwriting the allocated block buffer with the write data of the sub-block write command; and based on determining that no block buffer of the plurality of block buffers is allocated to the write address of the sub-block write command, allocating a block buffer of the plurality of block buffers to the write address and inserting the write data into the allocated block buffer.

5. The method of claim 3, further comprising, before writing the write data to the allocated byte stream buffer:

determining whether the write data can be merged with data that is already in the allocated byte stream buffer; and based on determining that the write data cannot be merged with data that is already in the allocated byte stream buffer, flushing the allocated byte stream buffer.

6. The method of claim 1, wherein the plurality of I/O commands further comprises a sub-block read command comprising a command to read an amount of read data having a size that is less than a size of one of the plurality of fixed-size storage blocks from the computer storage device, wherein processing the sub-block read command comprises:

determining whether a byte stream buffer of the plurality of byte stream buffers is allocated to a read address of the sub-block read command;

based on determining that a byte stream buffer of the plurality of byte stream buffers is allocated to the read address of the sub-block read command, reading the read data from the allocated byte stream buffer; and based on determining that no byte stream buffer of the plurality of byte stream buffers is allocated to the read address of the sub-block read command:

determining whether a block buffer of the plurality of block buffers is allocated to the read address of the sub-block read command;

based on determining that a block buffer of the plurality of block buffers is allocated to the read address of the sub-block read command, reading the read data from the allocated block buffer;

based on determining that no block buffer of the plurality of block buffers is allocated to the read address of the sub-block read command, reading the read data from the read address in the main storage.

7. The method of claim 6, further comprising, before reading the read data from the allocated byte stream buffer:

determining whether the sub-block read command can be fully serviced by data in the allocated byte stream buffer; and based on determining that the sub-block read command cannot be fully serviced by data in the allocated byte stream buffer:

determining whether a block buffer of the plurality of block buffers is allocated to the read address of the sub-block read command;

based on determining that a block buffer of the plurality of block buffers is allocated to the read address of the sub-block read command, reading the read data from the allocated block buffer;

based on determining that no block buffer of the plurality of block buffers is allocated to the read address of the sub-block read command, reading the read data from the read address in the main storage; and updating the read data with any applicable data from the allocated byte stream buffer.

8. A computer program product for implementing sub-block input/output (I/O) commands in a computer storage device, the computer program product comprising:

a computer readable storage medium having program instructions embodied therewith, the program instructions readable by a processing circuit to cause the processing circuit to perform a method comprising:

receiving a plurality of I/O commands on an I/O interface of the computer storage device, the computer storage device comprising a byte stream buffer module comprising a plurality of byte stream buffers, a block buffer module comprising a plurality of block buffers, and a main storage comprising a plurality of fixed-size storage blocks; and processing the plurality of I/O commands by the computer storage device, wherein the plurality of I/O commands comprises:

a block write command comprising a command to write an amount of write data having a size equal to one of the plurality of fixed-size storage blocks into the computer storage device; and a sub-block write command comprising a command to write an amount of write data having a size that is greater than zero and less than a size of one of the plurality of fixed-size storage blocks into the computer storage device, wherein processing the block write command comprises:

determining whether a byte stream buffer of the plurality of byte stream buffers is allocated to a write address of the block write command;

based on determining that a byte stream buffer of the plurality of byte stream buffers is allocated to the write address of the block write command, flushing the allocated byte stream buffer;

determining whether a block buffer of the plurality of block buffers is allocated to the write address of the block write command;

based on determining that a block buffer of the plurality of block buffers is allocated to the write address of the block write command, overwriting the allocated block buffer with the write data; and based on determining that no block buffer of the plurality of block buffers is allocated to the write address of the block write command, allocating a block buffer of the plurality of block buffers to the write address and inserting the write data into the allocated block buffer.

9. The computer program product of claim 8, wherein flushing the allocated byte stream buffer comprises:

determining whether a block buffer of the plurality of block buffers is allocated to a same address as the allocated byte stream buffer;

based on determining that no block buffer of the plurality of block buffers is allocated to the same address as the allocated byte stream buffer:

reading block data from the same address in the main storage;

allocating a block buffer to the same address; and inserting the block data into the allocated block buffer;

merging the contents of the allocated byte stream buffer into the allocated block buffer; and deallocating the allocated byte stream buffer.

10. The computer program product of claim 8, wherein the plurality of I/O commands further comprises a block read command comprising a command to read an amount of read data having a size equal to one of the plurality of fixed-size storage blocks from the computer storage device, wherein processing the block read command comprises:
   determining whether a block buffer of the plurality of block buffers is allocated to a read address of the block read command;
   based on determining that a block buffer of the plurality of block buffers is allocated to the read address of the block read command, reading the read data from the allocated block buffer;
   based on determining that no block buffer of the plurality of block buffers is allocated to the read address of the block read command, reading the read data from the read address in the main storage;
   determining whether a byte stream buffer of the plurality of byte stream buffers is allocated to the read address of the block read command; and
   based on determining that a byte stream buffer of the plurality of byte stream buffers is allocated to the read address of the block read command, updating the read data with data from the byte stream buffer.

11. The computer program product of claim 8, wherein processing the sub-block write command comprises:
   determining whether a byte stream buffer of the plurality of byte stream buffers is allocated to a write address of the sub-block write command;
   based on determining that a byte stream buffer of the plurality of byte stream buffers is allocated to the write address of the sub-block write command, writing the write data to the allocated byte stream buffer; and
   based on determining that no byte stream buffer of the plurality of byte stream buffers is allocated to the write address of the sub-block write command:
      determining whether a block buffer of the plurality of block buffers is allocated to the write address of the sub-block write command;
      based on determining that a block buffer of the plurality of block buffers is allocated to the write address of the sub-block write command, overwriting the allocated block buffer with the write data of the sub-block write command; and
      based on determining that no block buffer of the plurality of block buffers is allocated to the write address of the sub-block write command, allocating a block buffer of the plurality of block buffers to the write address and inserting the write data into the allocated block buffer.

12. The computer program product of claim 8, wherein the plurality of I/O commands further comprises a sub-block read command comprising a command to read an amount of read data having a size that is less than a size of one of the plurality of fixed-size storage blocks from the computer storage device, wherein processing the sub-block read command comprises:
   determining whether a byte stream buffer of the plurality of byte stream buffers is allocated to a read address of the sub-block read command;
   based on determining that a byte stream buffer of the plurality of byte stream buffers is allocated to the read address of the sub-block read command, reading the read data from the allocated byte stream buffer; and
   based on determining that no byte stream buffer of the plurality of byte stream buffers is allocated to the read address of the sub-block read command:
      determining whether a block buffer of the plurality of block buffers is allocated to the read address of the sub-block read command;
      based on determining that a block buffer of the plurality of block buffers is allocated to the read address of the sub-block read command, reading the read data from the allocated block buffer;
      based on determining that no block buffer of the plurality of block buffers is allocated to the read address of the sub-block read command, reading the read data from the read address in the main storage.

13. A computer storage device implementing sub-block input/output (I/O) commands, the computer storage device comprising:
   an I/O interface;
   a byte stream buffer module comprising a plurality of byte stream buffers;
   a block buffer module comprising a plurality of block buffers; and
   a main storage comprising a plurality of fixed-size storage blocks, the computer storage device configured to perform a method comprising:
   receiving a plurality of I/O commands on the I/O interface of the computer storage device; and
   processing the plurality of I/O commands by the computer storage device, wherein the plurality of I/O commands comprises:
      a block write command comprising a command to write an amount of write data having a size equal to one of the plurality of fixed-size storage blocks into the computer storage device; and
      a sub-block write command comprising a command to write an amount of write data having a size that is greater than zero and less than a size of one of the plurality of fixed-size storage blocks into the computer storage device,
   wherein processing the block write command comprises:
      determining whether a byte stream buffer of the plurality of byte stream buffers is allocated to a write address of the block write command;
      based on determining that a byte stream buffer of the plurality of byte stream buffers is allocated to the write address of the block write command, flushing the allocated byte stream buffer;
      determining whether a block buffer of the plurality of block buffers is allocated to the write address of the block write command;
      based on determining that a block buffer of the plurality of block buffers is allocated to the write address of the block write command, overwriting the allocated block buffer with the write data; and
   based on determining that no block buffer of the plurality of block buffers is allocated to the write address of the block write command, allocating a block buffer of the plurality of block buffers to the write address and inserting the write data into the allocated block buffer.

14. The computer storage device of claim 13, wherein flushing the allocated byte stream buffer comprises:
   determining whether a block buffer of the plurality of block buffers is allocated to a same address as the allocated byte stream buffer;
   based on determining that no block buffer of the plurality of block buffers is allocated to the same address as the allocated byte stream buffer:
      reading block data from the same address in the main storage;
      allocating a block buffer to the same address; and inserting the block data into the allocated block buffer;
merging the contents of the allocated byte stream buffer into the allocated block buffer; and
deallocating the allocated byte stream buffer.

15. The computer storage device of claim 13, wherein the plurality of I/O commands further comprises a block read command comprising a command to read an amount of read data having a size equal to one of the plurality of fixed-size storage blocks from the computer storage device, wherein processing the block read command comprises:
    determining whether a block buffer of the plurality of block buffers is allocated to a read address of the block read command;
    based on determining that a block buffer of the plurality of block buffers is allocated to the read address of the block read command, reading the read data from the allocated block buffer;
    based on determining that no block buffer of the plurality of block buffers is allocated to the read address of the block read command, reading the read data from the read address in the main storage;
    determining whether a byte stream buffer of the plurality of byte stream buffers is allocated to the read address of the block read command; and
    based on determining that a byte stream buffer of the plurality of byte stream buffers is allocated to the read address of the block read command, updating the read data with data from the byte stream buffer.

16. The computer storage device of claim 13, wherein processing the sub-block write command comprises:
    determining whether a byte stream buffer of the plurality of byte stream buffers is allocated to a write address of the sub-block write command;
    based on determining that a byte stream buffer of the plurality of byte stream buffers is allocated to the write address of the sub-block write command, writing the write data to the allocated byte stream buffer; and
    based on determining that no byte stream buffer of the plurality of byte stream buffers is allocated to the write address of the sub-block write command:
        determining whether a block buffer of the plurality of block buffers is allocated to the write address of the sub-block write command;
        based on determining that a block buffer of the plurality of block buffers is allocated to the write address of the sub-block write command, overwriting the allocated block buffer with the write data of the sub-block write command; and
        based on determining that no block buffer of the plurality of block buffers is allocated to the write address of the sub-block write command, allocating a block buffer of the plurality of block buffers to the write address and inserting the write data into the allocated block buffer.

17. The computer storage device of claim 13, wherein the plurality of I/O commands further comprises a sub-block read command comprising a command to read an amount of read data having a size that is less than a size of one of the plurality of fixed-size storage blocks from the computer storage device, wherein processing the sub-block read command comprises:
    determining whether a byte stream buffer of the plurality of byte stream buffers is allocated to a read address of the sub-block read command;
    based on determining that a byte stream buffer of the plurality of byte stream buffers is allocated to the read address of the sub-block read command, reading the read data from the allocated byte stream buffer; and
    based on determining that no byte stream buffer of the plurality of byte stream buffers is allocated to the read address of the sub-block read command:
        determining whether a block buffer of the plurality of block buffers is allocated to the read address of the sub-block read command;
        based on determining that a block buffer of the plurality of block buffers is allocated to the read address of the sub-block read command, reading the read data from the allocated block buffer;
        based on determining that no block buffer of the plurality of block buffers is allocated to the read address of the sub-block read command, reading the read data from the read address in the main storage.

* * * * *